United States Patent [19]

Kuwabara et al.

[11] Patent Number: 5,779,775

[45] Date of Patent: Jul. 14, 1998

[54] STOCK SOLUTION COMPOSITION FOR USE IN PRODUCTION OF HARD POLYURETHANE FOAM

[75] Inventors: Shin Kuwabara; Kazuhisa Nagata; Yasuo Imashiro; Eiji Sasaki, all of Tokyo, Japan

[73] Assignee: Nisshinbo Industries, Inc., Tokyo, Japan

[21] Appl. No.: 817,119

[22] PCT Filed: Sep. 5, 1996

[86] PCT No.: PCT/JP96/02519

§ 371 Date: Apr. 8, 1997

§ 102(e) Date: Apr. 8, 1997

[87] PCT Pub. No.: WO97/09362

PCT Pub. Date: Mar. 13, 1997

[30] Foreign Application Priority Data

Sep. 7, 1995 [JP] Japan ................................. 7-257095

[51] Int. Cl.$^6$ .............................. C09K 21/00; C08J 9/00
[52] U.S. Cl. ............................ 106/18.11; 106/18.12; 106/18.14; 252/600; 521/50; 521/53; 521/99; 521/122; 521/123; 521/903; 521/906
[58] Field of Search .................... 106/18.11, 18.12, 106/18.14; 252/600; 521/50, 53, 99, 122, 123, 903, 906

[56] References Cited

U.S. PATENT DOCUMENTS

| | | | |
|---|---|---|---|
| 3,681,273 | 8/1972 | Kelly | 521/177 |
| 3,803,063 | 4/1974 | Krentz, Jr. | 521/137 |
| 3,981,831 | 9/1976 | Markusch et al. | 521/159 |
| 4,139,501 | 2/1979 | Rudner et al. | 521/136 |
| 4,275,169 | 6/1981 | Rudner et al. | 521/99 |
| 4,734,439 | 3/1988 | Reischl | 521/54 |
| 4,801,621 | 1/1989 | Reischl | 521/53 |
| 4,855,052 | 8/1989 | Reischl | 210/632 |
| 5,124,367 | 6/1992 | Barker et al. | 521/107 |

FOREIGN PATENT DOCUMENTS

| | | |
|---|---|---|
| 50-86598 A | 7/1975 | Japan |
| 57-59950 A | 4/1982 | Japan |
| 58-213015 A | 12/1983 | Japan |
| 60-170614 A | 9/1985 | Japan |
| 60-260633 A | 12/1985 | Japan |
| 4-63869 A | 2/1992 | Japan |
| 6-9815 A | 1/1994 | Japan |

OTHER PUBLICATIONS

WPIDS Abstract No. 78-62731A which is an abstract of Japanese Patent Specification No. 53-085897 (Jul. 1978).
WPIDS Abstract No. 89-260945 which is an abstract of Japanese Patent Specification No. 01-190718 (Jul. 1989).
WPIDS Abstract No. 92-010243 which is an abstract of Japanese Patent Specification No. 04-252219 (Sep. 1992).
JAPIO Abstract No. JP361002722A which is an abstract of Japanese Patent Specification No. 61-002722 (Jan. 1986).
JAPIO Abstract No. JP404120119A which is an abstract of Japanese Patent Specification No. 04-120119 (Apr. 1992).
WPIDS Abstract No. 79-56795B which is an abstract of Japanese Patent Specification No. 54-076696 (Jun. 1979).
WPIDS Abstract No. 89-089997 which is an abstract of Japanese Patent Specification No. 01-040588 (Feb. 1989).

*Primary Examiner*—Anthony Green
*Attorney, Agent, or Firm*—Kubovcik & Kubovcik

[57] ABSTRACT

The object of the present invention is to provide a stock solution composition for use in production of hard polyurethane foam, which composition can disperse the flame retardant filler component stably therein when allowed to stand and, when subjected to stirring or an external pressure, has a reduced viscosity, promising easy transfer of the composition and easy foaming in production of hard polyurethane foam at the site. The present invention provides a stock solution composition for use in production of hard polyurethane foam, which comprises, as the essential components, a polyol, a foaming agent, a flame retardant filler, a flame retarder and a solvent-swollen clay mineral. The swollen clay mineral has thixotropy; that is, it is a gel owing to the interaction between molecules when allowed to stand and, when subjected to an external pressure or the like, said interaction between molecules is cut and the gel changes into a liquid sol. The present invention utilizes this thixotropy and provides a stock solution composition for use in production of hard polyurethane foam, which composition has a high viscosity when allowed to stand and, when subjected to stirring or an external pressure, has a reduced viscosity.

5 Claims, 1 Drawing Sheet

After 15 days → No precipitate

After 15 days → Precipitate

STOCK SOLUTION COMPOSITION FOR USE IN PRODUCTION OF HARD POLYURETHANE FOAM

TECHNICAL FIELD

The present invention relates to a stock solution composition for use in production of hard polyurethane foam, wherein a flame-retardant filler is dispersed stably. More particularly, the present invention relates to a stock solution composition for use in production of hard polyurethane foam, which composition contains a solvent-swollen clay mineral and consequently has a high viscosity when allowed to stand and a reduced viscosity when subjected to stirring or an external pressure.

BACKGROUND ART

For production of hard polyurethane foam, a process is known which uses a polyol solution composition and trichlorofluoromethane (hereinafter referred to as CFC-11) as a foaming agent. Since flons (CFC-11 is included therein) are believed to cause the destruction of ozone layer (which leads to environmental disruption), reduction in amount of flon used or total ban of use of flon has been initiated. In that connection, dichlorotrifluoroethane (hereinafter referred to as HCFC-123) and dichlorofluoroethane (hereinafter referred to as HCFC-141b) are each being looked at as a promising candidate for substitute flon. However, even for these substitute flons, reduction in amount used or total ban of use is anticipated in a near future. Therefore, in production of hard polyurethane foam, it is drawing attention to use, as a foaming agent, $CO_2$ which is generated in reaction of water and isocyanate.

However, when a hard polyurethane foam produced using above-mentioned $CO_2$ is compared with a hard polyurethane foam produced using CFC-11 in a conventional process, the hard polyurethane foam produced with the $CO_2$ has significantly inferior (low) dimensional stability, because the $CO_2$ generated by the reaction of water and isocyanate passes through the walls of foam cells and diffuses into air and this gives rise to shrinkage of foam with the lapse of time. When, in order to avoid the above problem, the water content in the polyol solution composition is reduced, and the proportion of the foam generated is reduce to suppress the degree of shrinkage, the resulting polyurethane foam has a high density and increased weight, and has reduced flame retardancy owing to increased urethane bond amount.

Hence, it was proposed to add, to a polyol solution composition, generally a flame retardant to increase the flame retardancy of the polyurethane foam obtained and further add an inorganic or organic filler (which is a flame retardant or non-flammable substance) to increase the strength and flame retardancy of the polyurethane foam. These proposals were made in, for example, a process using a cyclic phosphagen as a flame retardant [Japanese Patent Application Kokai (Laid-Open) No. 190718/1989] and a process using a molybdenum oxide powder [Japanese Patent Application Kokai (Laid-Open) No. 85897/1978]. These processes are known even in conventional production of polyurethane foam using a flon, and use of such a technique is thought to provide a polyurethane foam having a high strength and high flame retardancy.

The flame retardant or nonflammable filler, however, has a problem. That is, although the filler can be dispersed in a polyol composition by forced stirring using a mixer or the like, the filler precipitates with the lapse of time and does not promise long term storage; therefore, the polyol composition containing the above filler must be subjected, prior to its use, to stirring or the like for dispersion of the filler, greatly reducing the work efficiency.

In order to prevent the precipitation of the flame retardant or nonflammable filler, it was proposed to add a thickener to a polyol composition containing the filler, to increase the viscosity of the composition and stably disperse the filler in the composition [Japanese Patent Application Kokai (Laid-Open) No. 252219/1992]. It is reported that use of a polyol composition having a viscosity of, for example, about 800 cp at 25° C. can assure stable dispersion of about 0.5 day.

In this case, however, since the viscosity of the polyol composition is highly temperature dependent, the transfer of the composition at low temperature production of polyurethane foam becomes very difficult owing to the high viscosity of the composition (for example, the viscosity of 300 cp at 25° C. increases to 1,400 cp at 10° C.). Use of a polyol composition of relatively low viscosity (about 400 cp at 25° C.) for prevention of the above problem, however, invites precipitation of filler in few to several hours.

The object of the present invention is to eliminate the above-mentioned drawbacks of the prior art and provide a stock solution composition for use in production of hard polyurethane foam, which composition can disperse the flame retardant filler component stably therein when allowed to stand and, when subjected to stirring or an external pressure, has a reduced viscosity, promising easy transfer of the composition and easy foaming in production of hard polyurethane foam at the site.

DISCLOSURE OF THE INVENTION

According to the present invention, there is provided a stock solution composition for use in production of hard polyurethane foam, which comprises, as the essential components, a polyol, a foaming agent, a flame retardant filler, a flame retarder and a solvent-swollen clay mineral.

In view of the above situation, the present inventors made a study. As a result, the present inventors thought of the use of swellable clay mineral as a thickener and found out that (1) when a solvent-swollen clay mineral is added to a stock solution composition for use in production of hard polyurethane foam, a high thickening effect is obtained according to the amount of said clay mineral added and the high static viscosity of the resulting composition can disperse the flame retardant filler component stably in the composition and (2) the clay mineral added composition, when its static viscosity is few to several thousand centipoises, reduces its viscosity greatly owing to its thixotropy when subjected to an external pressure or a vibration, making easy its transfer and enabling easy foaming in production of polyurethane foam, whereby a hard polyurethane foam of stable foam and low density can be obtained. The above finding has led to the completion of the present invention.

BEST MODE FOR CARRYING OUT THE INVENTION

Figure 1:
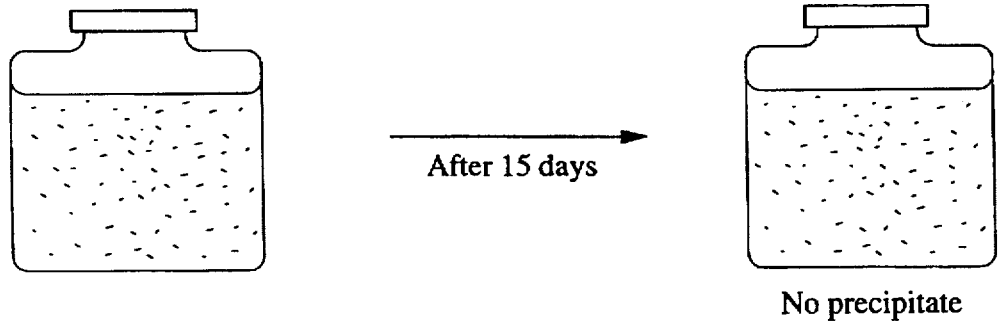
FIG. 1 is a conceptual view showing the precipitation state of antimony trioxide powder when the composition of the present invention was stirred and then allowed to stand at room temperature.

The present invention is hereinafter described in detail.

The polyol component used in the present stock solution composition is not particularly restricted as to its type and can be any polyol used in production of polyurethane foam. Preferable examples of the polyol are phthalic acid ester type polyols, ethylenediamine type polyols, tolylenediamine type polyols, sugar amine type polyols, polyether type polyols, mannitol and sorbitol. The polyol component is used in the stock solution composition in an amount of about 10–90% by weight of the composition.

The foaming agent used in the present stock solution composition may be a flon (e.g. chlorofluoro carbon, hydrofluoro carbon or hydrochlorofluoro carbon) or water and is not particularly restricted as to its type. However, water is preferred. The foaming agent is used in the stock solution composition in an amount of about 0.1–40% by weight of the composition.

The flame retardant filler used in the present stock solution composition is not particularly restricted as to its type as long as it is mentioned as a nonflammable substance, nearly nonflammable substance or flame retardant substance satisfying the requirements for flame retardant grade No. 1, No. 2 and No. 3, specified in JIS A 1321 (Testing Method for Incombustibility of Internal Finish Material and Procedure of Buildings). Preferable examples of the flame retardant filler are inorganic fillers such as antimony trioxide, aluminum hydroxide and carbon black, and organic fillers such as melamine. These fillers are powdery or granular. In the present invention, a filler having particle diameters of 1 mm or less and a bulk density of up to about 10 g/cm$^3$ can be used and dispersed in the stock solution composition. The flame retardant filler is used in the stock solution composition in an amount of about 0.1–10% by weight of the composition.

The flame retardant used in the present stock solution composition is not particularly restricted as long as it does not separate from the stock solution composition, and is a liquid having a low viscosity and a low vapor pressure or is a solid soluble in the stock solution composition. Preferable as the flame retardant are liquids such as tris-β-chloropropylphosphate, triethyl phosphate, dioctyl phthalate and the like, and solids such as bisphenol, dibromoneopentyl glycol and the like, all ordinarily used in production of polyurethane foam. The flame retardant is used in the stock solution composition in an amount of about 1–50% by weight of the composition.

The clay mineral used in the present stock solution composition is not particularly restricted as long as it shows thixotropy when swollen in a solvent. Preferable examples are halloysite and swollen mica; and particularly preferable examples are smectites such as montmorillonite, beidellite, nontronite, hectorite, sauconite, stevensite, saponite and the like, and synthetic products corresponding to said smectites. These swellable clay minerals are water-swellable inherently but can be swollen in an oleophilic solvent by using an appropriate surfactant. The clay mineral is used in the present stock solution composition in an amount of about 0.1–20% by weight of the composition.

The clay mineral is swollen in a solvent and is used in the present stock solution composition together with other components. The solvent includes aromatic hydrocarbons such as benzene, toluene, xylene and the like; ethers such as ethylether, tetrahydrofuran and the like; ketones such as acetone, methyl ethyl ketone and the like; aliphatic hydrocarbons such as n-pentane, n-hexane, n-octane and the like; alcohols such as methanol, ethanol, n-propanol, isopropanol and the like; halogenated hydrocarbons such as carbon tetrachloride, chloroform, dichloromethane, 1,2-dichloroethane, perchloroethylene, chlorobenzene and the like; ethyl acetate; dimethylformamide; silicone oil; and so forth.

Some of the above-mentioned polyols, foaming agents and liquid flame retardants can swell the clay mineral. They include diethylene glycol and dipropylene glycol (polyols); water (foaming agent); tris-chloropropyl phosphate, triethylphosphate and dioctyl phthalate (liquid flame retardants). The clay mineral may be swollen by these components.

The thus swollen clay mineral has thixotropy; that is, it is a gel owing to the interaction between molecules when allowed to stand and, when subjected to an external pressure or the like, said interaction between molecules is cut and the gel changes into a liquid sol. In the present invention, by utilizing this thixotropy of the swollen clay mineral, there is provided a stock solution composition for use in production of hard polyurethane foam, which composition has a high viscosity when allowed to stand and, when subjected to stirring or an external pressure, has a reduced viscosity.

The content of the clay mineral in the present stock solution composition is controlled in an amount of about 0.1–20% by weight of the composition so that the composition has a viscosity of 1,000–10,000 cp at 25° C. when allowed to stand and, when subjected to stirring or an external pressure, a viscosity of 1–500 cp at 25° C. When the composition has a viscosity of 1,000–10,000 cp at 25° C. when allowed to stand, the filler in the composition causes no precipitation and can be stably dispersed therein; and when the composition has a viscosity of 1–500 cp at 25° C. when subjected to stirring or an external pressure, transfer of composition and foaming are easy in production of polyurethane foam.

In production of the present stock solution composition for producing a hard polyurethane foam, it is preferable that the clay mineral is beforehand swollen in a solvent such as mentioned above and the swollen clay mineral is mixed with a polyol and other components to obtain a stock solution composition. The reason is that it generally takes a very long time to swell the clay mineral and, when the unswollen clay mineral is mixed with a polyol and other components, the clay mineral precipitates and several days or, in some cases, one month or more are required until the clay mineral is swollen.

In order to obtain a hard polyurethane foam of good quality, various additives such as catalyst and the like maybe added to the present stock solution composition. The additive can be exemplified by an amine catalyst, a trimerization catalyst, a metal catalyst, a surfactant and a mixture thereof, all used in production of polyurethane foam.

The amine catalyst can be exemplified by pentamethyldiethylenetriamine, triethylenediamine and N-methyldimethylaminopropylamine. The trimerization catalyst can give a hard polyurethane foam of higher flame retardancy and strength and can be exemplified by quaternary ammonium formate, potassium octylate and potassium acetate. The metal catalyst includes dibutyltin alkyl maleate, butyltin mercapto and octyltin mercapto. The surfactant can be exemplified by dimethylpolysiloxane and nonylphenol ethylene oxide.

Production of hard polyurethane foam using the present stock solution composition can be conducted by a conventional process, for example, by reacting the stock solution composition with a polyisocyanate component in a 1:1 volume ratio. The polyisocyanate component is not particularly restricted and can be any polyisocyanate generally used in production of hard polyurethane foam. The reaction conditions used in the above reaction are not particularly restricted, either.

The present invention is hereinafter described in more detail by way of Examples. However, the present invention is not restricted by these Examples.

EXAMPLES 1–9

Stock solution compositions for use in production of hard polyurethane foam were prepared according to the formulations shown in Table 1, using a surfactant containing synthetic smectite (SPN, a product of Co-op Chemical Co., Ltd.) swollen with triethyl phosphate (hereinafter referred to as TEP). 500 ml of each of these compositions was thoroughly stirred using a handmixer, then allowed to stand for 15 days at room temperature, and observed for the precipitation state of antimony trioxide powder. The results (the precipitation state after 15 days) are shown in FIG. 1. Separately, each composition was allowed to stand for 10 days and then measured for viscosity at 25° C. and viscosity after forced stirring. The results are shown in Table 2.

Comparative Examples 1 and 2

Figure 2:
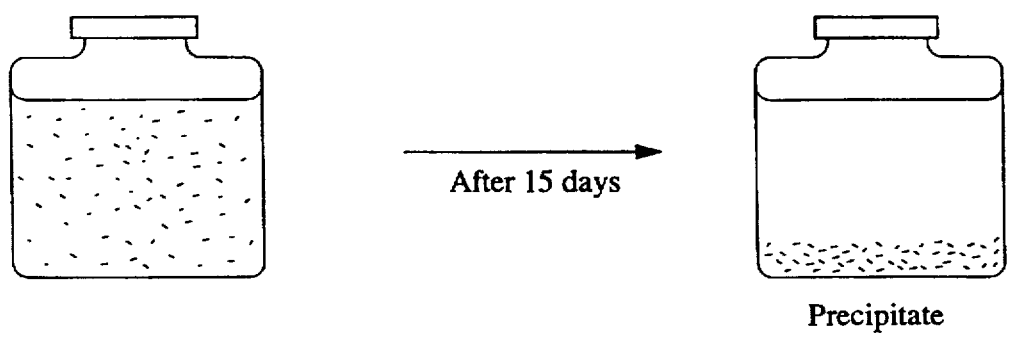
FIG. 2 is a conceptual view showing the precipitation state of antimony trioxide powder when the composition of Comparative Example was stirred and then allowed to stand at room temperature.

Stock solution compositions for use in production of hard polyurethane foam were prepared according to the formulations shown in Table 1, using no SPN. 500 ml of each of these compositions was thoroughly stirred using a hand mixer, then allowed to stand for 15 days at room temperature, and observed for the precipitation state of antimony trioxide powder. The results (the precipitation state after 15 days) are shown in FIG. 2. Separately, each composition was allowed to stand for 10 days and then measured for viscosity at 25° C. and viscosity after forced stirring. The results are shown in Table 2.

As is clear from Table 1, antimony trioxide was dispersed well in the compositions of Examples 1–9 each using a TEP solution containing 10% or 15% SPN, while most of the antimony trioxide precipitated in the compositions of Comparative Examples 1 and 2.

TABLE 1

| (Wt %) | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 |
|---|---|---|---|---|---|---|---|---|---|---|---|
| Polyol | | | | | | | | | | | |
| A | 85.0 | 84.0 | 80.0 | 85.0 | 84.0 | 80.0 | | | | 85.0 | |
| B | | | | | | | 10.0 | | | | 37.9 |
| C | | | | | | | | 40.0 | | | |
| D | | | | | | | | | 50.0 | | |
| Water | 2.0 | 2.0 | 2.0 | 2.0 | 2.0 | 2.0 | 5.0 | 5.0 | 5.0 | 2.0 | 0.1 |
| Surfactant | 2.0 | 2.0 | 2.0 | 2.0 | 2.0 | 2.0 | 2.0 | 2.0 | 2.0 | 2.0 | 2.0 |
| Amine catalyst | 2.0 | 2.0 | 2.0 | 2.0 | 2.0 | 2.0 | 2.0 | 2.0 | 2.0 | 2.0 | 2.0 |
| Trimerization catalyst | | | | | | | 2.0 | | | | 2.0 |
| Tin catalyst | 1.0 | 1.0 | 1.0 | 1.0 | 1.0 | 1.0 | 1.0 | 1.0 | 1.0 | 1.0 | 1.0 |
| TEP solution containing 10% SPN in a swollen state | 7.0 | 7.0 | 7.0 | | | | | | | | 0.1 |
| TEP solution containing 15% SPN in a swollen state | | | | 7.0 | 7.0 | 7.0 | 27.0 | 15.0 | 10.0 | | |
| Antimony trioxide powder | 1.0 | 2.0 | 6.0 | 1.0 | 2.0 | 6.0 | 20.0 | 20.0 | 20.0 | 1.0 | 5.0 |
| TEP | | | | | | | 31.0 | 15.0 | 10.0 | 7.0 | 50 |
| Index | 113.0 | 113.6 | 117.2 | 113.0 | 113.6 | 117.2 | 116.2 | 106.0 | 108.0 | 113.0 | 110.9 |
| Precipitation state | No Precipitate | No Precipitate | No Precipitate | No Precipitate | No Precipitate | No Precipitate | No Precipitate | No Precipitate | No Precipitate | Precipitate | Precipitate |

Polyol
A: A mixture of 47% of an ethylenediamine type polyol, 24% of a sugar amine type polyol, 24% of a tolylenediamine type polyol and 5% of diethylene glycol
B: Dipropylene glycol
C: A tolylenediamine type polyol
D: A phthalic acid ester type polyol
Surfactant: Dimethyl polysiloxane (CF 2021, a product of Dow Corning Toray Silicone Co., Ltd.)
Amine catalyst: Pentamethyldiethyltriamine
Tin catalyst: Dibutyltin alkyl maleate (a product of Katusta Koko K.K.)
SPN: Lucentite (oleophilic smectite, surfactant-added synthetic smectite, a product of Co-op chemical Co., Ltd.)

TABLE 2

|  | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 |
|---|---|---|---|---|---|---|---|---|---|---|---|
| Viscosity of stock solution composition at 25° C. (cp) | 3600 | 3700 | 3700 | 4500 | 4600 | 4600 | 2700 | 3200 | 3500 | 800 | 250 |
| When allowed to stand Right after stirring* (cp) | 400 | 400 | 400 | 450 | 450 | 450 | 410 | 410 | 420 | 420 | 240 |

*Stirring was conducted at 490 rpm at 25° C. for 1 minute.

As is clear from Table 2, the compositions of Examples 1–9 each using a TEP solution containing 10% or 15% SPN, as compared with the compositions of Comparative Examples 1 and 2, showed thixotropy promising easy transfer of composition and easy foaming in production of polyurethane foam.

Figure 3:
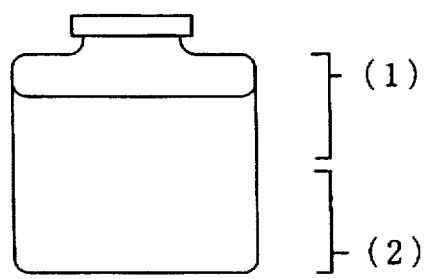
FIG. 3 is a conceptual view showing the sites from which each sample for flammability test was taken.

As to the compositions of Examples 1, 7, 8 and 9 and the composition of Comparative Example 1, respective samples were taken from the portions (1) and (2) shown in FIG. 3, using a 50 ml transfer pipet. Each sample was reacted with 50 ml of MDI, whereby polyurethane foams having the properties shown in Table 3 were produced.

Incidentally, the properties shown in Table 3 were measured as follows.

Compression strength

Measured according to JIS A 9526.

Dimensional stability

Three test pieces each of 100 mm×100 mm×50 mm were cut out from a polyurethane foam and measured for width (a), depth (b) and height (c) at an accuracy of 0.1 mm. The test pieces were allowed to stand at room temperature for 24 hours and again measured for width (a'), depth (b') and height (c'). The dimensional stability

TABLE 3

|  |  | Density (Kg/m$^3$) | Compression strength (Kgf/cm$^2$) | Dimensional change (%) | Flammability | Remarks |
|---|---|---|---|---|---|---|
| Ex. 1 | (1) | 28.2 | 1.66 | −0.19 | Caught no fire | Upper uniform portion |
|  | (2) | 28.0 | 1.62 | −0.16 | Caught no fire | Lower uniform portion |
| Ex. 7 | (1) | 29.1 | 1.53 | −0.13 | Caught no fire | Upper uniform portion |
|  | (2) | 29.3 | 1.50 | −0.13 | Caught no fire | Lower uniform portion |
| Ex. 8 | (1) | 30.0 | 1.49 | −0.15 | Caught no fire | Upper uniform portion |
|  | (2) | 29.9 | 1.51 | −0.17 | Caught no fire | Lower uniform portion |
| Ex. 9 | (1) | 30.9 | 1.78 | −0.09 | Caught no fire | Upper uniform portion |
|  | (2) | 30.5 | 1.76 | −0.05 | Caught no fire | Lower uniform portion |
| Comp. Ex. 1 | (1) | 27.1 | 1.62 | −5.21 | Caught fire | Super natant portion |
|  | (2) | 30.9 | 1.92 | −0.21 | Caught no fire | Precipitate portion |

As is clear from Table 3, in Comparative Example 1, the portion (1) and the portion (2) gave polyurethane foams being different in properties. That is, the portion (2), which contained a large amount of antimony trioxide precipitate, gave a polyurethane foam which had about the same properties (in compression strength, dimensional stability and flammability) as the polyurethane foam produced from the composition of Example 1; however, the portion (1), which was a supernatant portion, gave a polyurethane foam having a very high dimensional change of −5.2% and a strength reduced by 0.3 kgf/cm$^2$. In contrast, in each of Examples 1, 7, 8 and 9, there was no difference between the portion (1) and the portion (2) and each portion could give a polyurethane foam causing no problem in actual use. Thus, use of SPN gave the uniform dispersion of filler and enabled production of polyurethane foam uniform in quality.

of the polyurethane foam was calculated using the following formula.

Dimensional stability (%)=|(a'+b'+c')−(a+b+c)|/(a+b+c)×100

Flammability

A test piece of 100 mm×100 mm×30 mm was cut out from a polyurethane foam. A fire was applied to the test piece for 60 seconds, using a lighter; the lighter was removed; and whether or not the test piece caught fire, was examined.

Industrial Applicability

The stock solution composition of the present invention for use in production of hard polyurethane foam can stably disperse the flame retardant filler component when allowed to stand and, when subjected to stirring or an external pressure, has a reduced viscosity and promises easy transfer of composition and easy foaming in production of hard polyurethane foam.

The hard polyurethane foam produced using the present stock solution composition is uniform in quality and has improved properties particularly in flame retardancy.

We claim:

1. A stock solution composition for use in production of hard polyurethane foam, which comprises, as the essential components:
   (a) 10–90% of a polyol,
   (b) 0.1–40% of a foaming agent,
   (c) 0.1–10% of a flame retardant filler,
   (d) a flame retarder and
   (e) 0.1–20% of a solvent-swollen clay mineral.

2. A stock solution composition according to claim 1, wherein the content of the clay mineral present in the solvent-swollen clay mineral is 0.1–20% by weight of the composition.

3. A stock solution composition according to claim 1, wherein the solvent present in the solvent-swollen clay mineral is at least one member selected from the polyol, the foaming agent and the flame retarder.

4. A stock solution composition according to claim 1, wherein the solvent-swollen clay mineral has thixotropy.

5. A stock solution composition according to claim 1, which has a viscosity of 1,000–10,000 cp when allowed to stand and a viscosity of 1–500 cp when subjected to stirring or an external pressure.

* * * * *